Jan. 6, 1953   W. A. RAY   2,624,358
SAFETY CONTROL FUEL VALVE
Filed Dec. 14, 1948   4 Sheets-Sheet 2

WILLIAM A. RAY,
INVENTOR.

BY John Flam
ATTORNEY

Jan. 6, 1953 W. A. RAY 2,624,358
SAFETY CONTROL FUEL VALVE
Filed Dec. 14, 1948 4 Sheets-Sheet 4

WILLIAM A. RAY,
INVENTOR.

BY John Flam
ATTORNEY

Patented Jan. 6, 1953

2,624,358

UNITED STATES PATENT OFFICE 2,624,358

SAFETY CONTROL FUEL VALVE

William A. Ray, North Hollywood, Calif., assignor to General Controls Co., a corporation of California Application December 14, 1948, Serial No. 65,113

3 Claims. (Cl. 137—66)

This invention relates to a fuel valve structure, and especially to one that incorporates a main rotary plug structure for controlling the flow of fuel to a main burner, as well as a safety valve structure that can be opened only when the plug is in a position to interrupt flow of fuel to a main burner. The safty valve structure can be maintained in open position only while the pilot burner is burning. Thus, upon failure of the pilot flame, the safety valve closes, and flow of fuel to both the main and pilot burners is interrupted.

To reset the valve, it is necessary first to turn the plug to a fully closed position. The handle operating the plug is then moved still further to operate the safety valve; the safety valve, while held in open position by the handle, serves to pass fuel to the pilot burner. Now that burner can be ignited; and shortly thereafter the handle can be released, and the safety valve closure is held in position by a force existing by virtue of the existence of the pilot flame. Then the plug can be rotated to supply fuel to the main burner.

Such a system in general is shown in a prior application, Serial No. 55,119, filed October 18, 1948, in the name of William A. Ray, and entitled: "Automatic Safety Valve for Fuel Burners." This application is a continuation, in part, of said prior application.

In that prior application, the safety valve structure is latched in open position, after the pilot burner is ignited, by the aid of an electromagnet that is energized by a thermocouple. The thermocouple has a hot junction heated by the pilot flame; and, although the electrical energy thus generated by the thermocouple is quite small, yet it is sufficient to move a latch into holding position.

The present invention utilizes substantially the same valve closure structures; but, instead of operating a latch, the electromagnet is used to hold the safety valve closure structure in open position by magnetic attraction of an armature connected to the closure. The force exerted by the electromagnet is insufficient to attract its armature when it is in the position corresponding to closing of the safety valve. The safety valve closure is accordingly so arranged that it places the armature to attracted position when the closure is manually moved to open position. Once the armature is thus moved to attracted position, the electromagnet has sufficient power to hold it and the safety valve closure against a biasing force tending to close the safety valve.

It is one of the objects of this invention to improve, in general, apparatus of this character.

More specifically, it is an object of this invention to simplify the electromagnetic structure, and particularly to make it possible to remove and replace the electromagnet for repairs and renewal without disturbing the valve mechanism.

It is still another object of this invention to provide a simple and compact valve structure.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
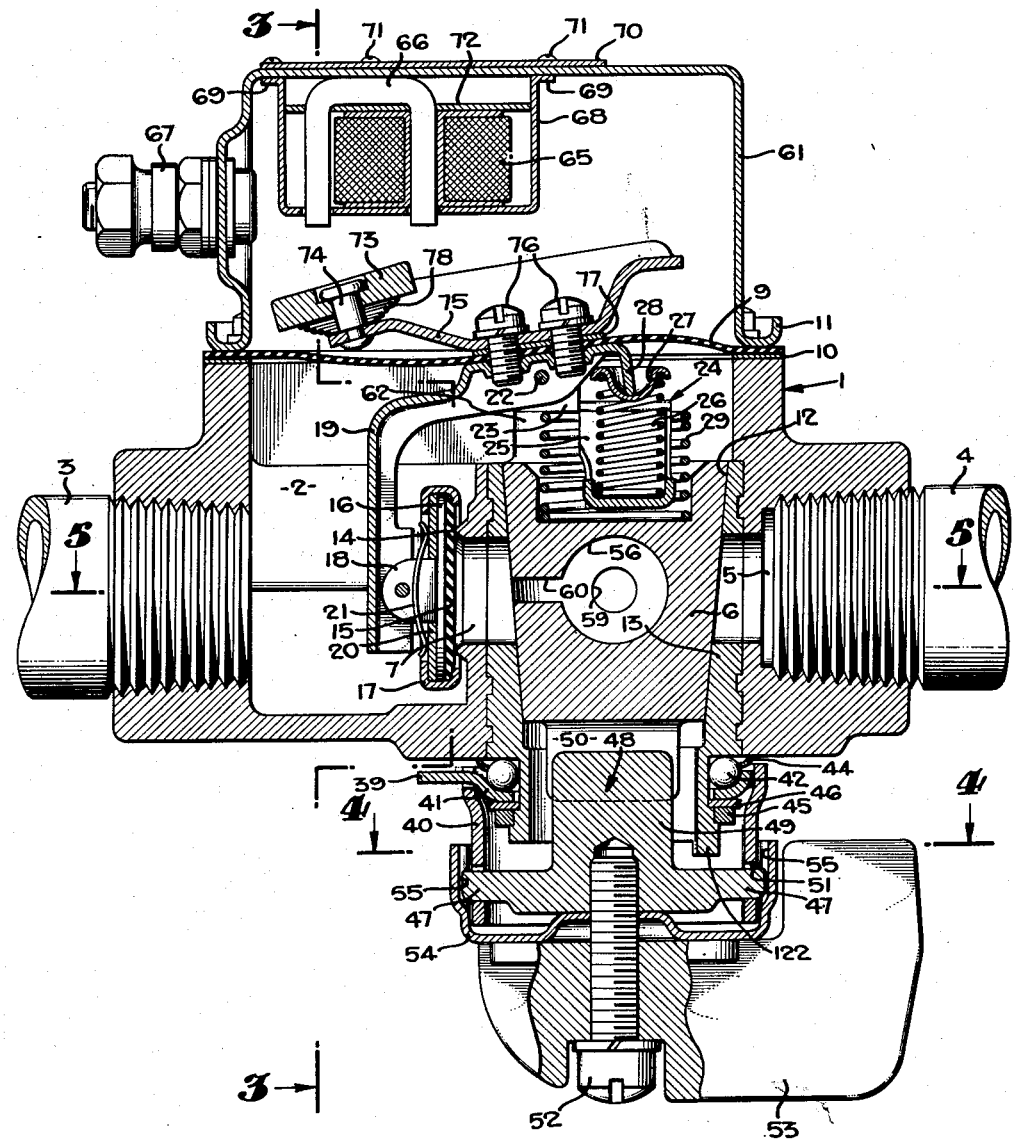
Figure 1 is a vertical section of a valve structure incorporating the invention, the safety valve being in closed position.

The valve structure proper, illustrated in Figs. 1, 2, 3 and 5, is substantially identical with that illustrated in the said prior application hereinabove referred to. It is shown as including a valve body 1 made, for example, as a die casting, and having an inlet chamber 2 open at the top. The inlet conduit 3 communicates with the chamber 2. The outlet conduit 4 communicates with a port 5 located in the wall of the body 1. This port 5 is controlled by the rotary tapered plug 6 which is adapted to be rotated by hand to an open or closed position. The operating means for rotating the rotary plug 6 will be described hereinafter.

The chamber 2 leads to a port 7 which is formed in that part of the body 1 that provides a tapered seat 12 for the plug 6. Accordingly, in order to pass fuel to outlet conduit 4 and to a main burner 8 (Fig. 5), it is necessary to turn the plug 6 in a clockwise direction; and it is necessary that the port 7 be open to the inlet chamber 2.

The body 1 has an open top which is sealed by a flexible diaphragm 9. This flexible diaphragm 9 rests upon a packing ring 10, and is urged to sealing relationship by the aid of a flange 11 of a supplemental housing or casing 61 extending above the diaphragm 9 and exteriorly thereof.

The plug 6 rests in the conical seat 12 defined by a seat-forming sleeve member 13. This sleeve member 13 may be appropriately cast into a corresponding aperture in the body 1.

The port 7 defines an annular tapered safety valve seat 14 at its left-hand end. A safety valve closure structure cooperates with the seat 14 optionally to close and open the port 7. This closure structure includes a resilient disc 15 (made of rubber or similar material). This disc 15 is held against a metal backing plate 16, as by a ring 17 that is turned inwardly at its edges. Plate 16 is provided with an ear 18 pivotally mounted on a lever 19 (Figs. 1, 2, 3 and 4). A metal washer 20, through which the ear 18 passes, is urged against the backing member 16 by a bowed leaf spring 21. The left-hand convex edge of this leaf spring 21 is restrained by the ribs of the lever 19.

In the closed position of Fig. 1, the disc 15 engages the tapered seat 14, and the flow of fuel is interrupted between the inlet conduit 3 and the outlet conduit 4.

Figure 6:
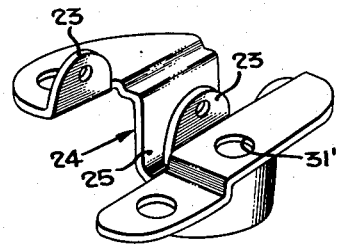
Fig. 6 is a pictorial view of one of the brackets used in connection with the invention.

The lever 19 is pivoted upon a pin 22. This pin 22 is accommodated in ears 23 (Figs. 3 and 6) formed integrally with a bracket 24. This bracket 24 has a downwardly extending portion 25 that forms a cup to accommodate the lower end of a compression spring 26 that urges the lever 19 to valve closing position. The bracket 24 is attached to the bosses 62 formed integrally with the body 1.

The upper end of compression spring 26 urges a cup-like member 27 upwardly and into contact with a projection 28 formed on the end of the lever 19.

The plug 6 is urged against its seat 12 by the aid of a compression spring 29. The lower end of this spring 29 is seated in an appropriate recess in the top of the plug 6. Its upper end engages the cross arm of the bracket 24.

Figure 3:
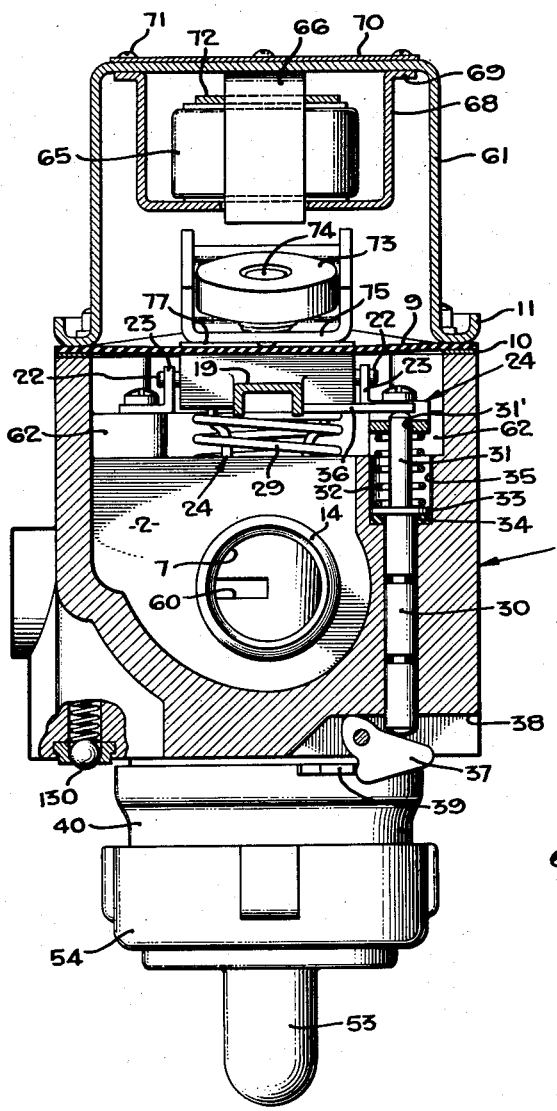
Fig. 3 is a sectional view, taken along plane 3—3 of Fig. 1.
Figure 2:
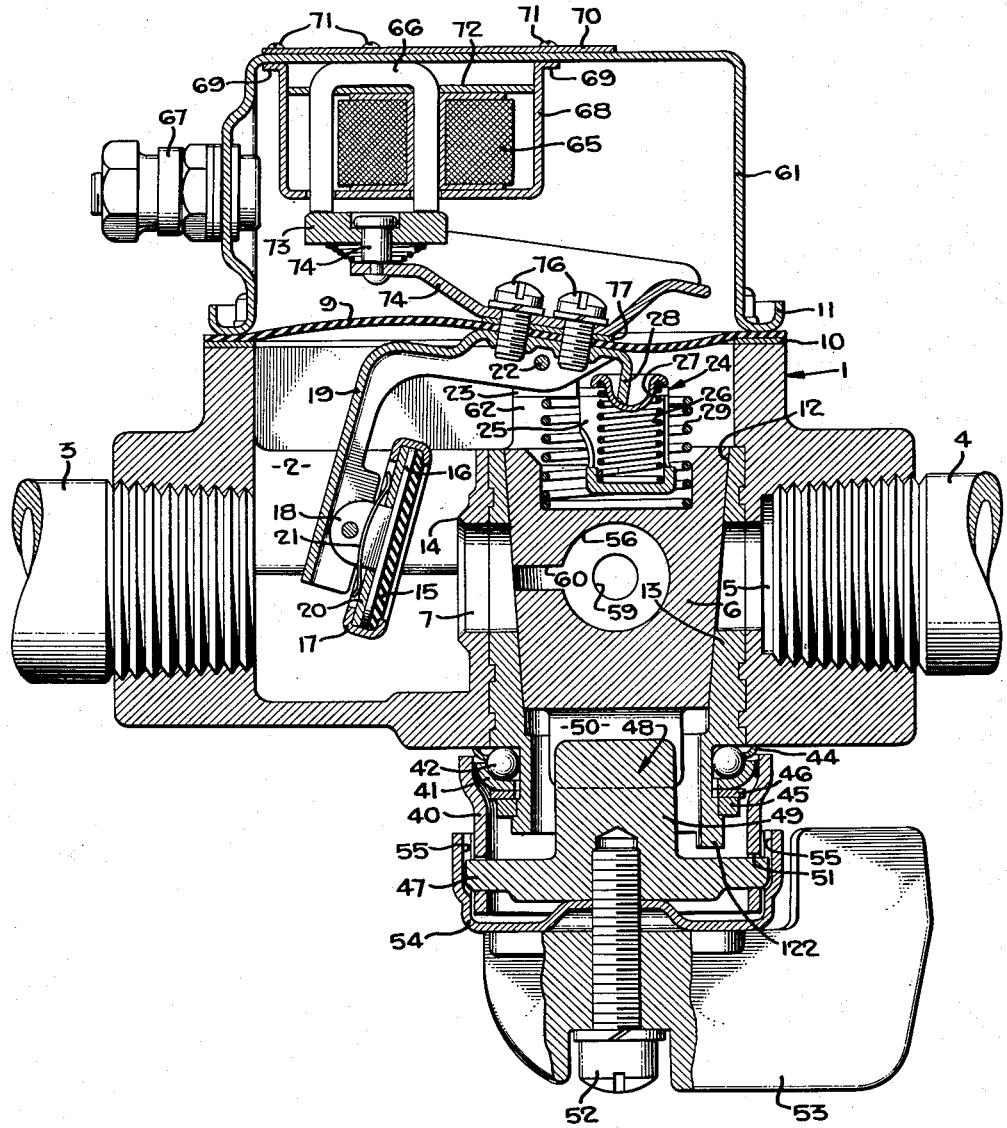
Fig. 2 is a view, similar to Fig. 1, illustrating the safety valve held in open position by operation of the pilot burner.

Opening of the safety valve closure structure to the position of Fig. 2 is effected by the aid of mechanism shown most clearly in Fig. 3. A push rod 30 is slidably mounted for vertical movement in the body 1 and has a reduced upper portion 31. This portion is guided by aperture 31' (Fig. 6) of bracket 24. Normally, the push rod 30 is urged downwardly out of operating position by the aid of a compression spring 32 surrounding the reduced portion 31. The upper end of this spring is confined by a portion of the bracket 24. Its lower end engages a washer 33 seated on the shoulder formed by the push rod 30 and the reduced portion 31. A packing washer 34 is seated in a recess 35 formed in the body 1.

Upon upward movement of the push rod 30 an arm 36 attached to the lever 19 is urged upwardly so as to rock the lever 19 in a counterclockwise direction, as viewed in Fig. 1.

In order to urge the push rod 30 upwardly, use is made of a crank 37 pivotally mounted in a recess 38 of the body member 1. The crank 37 is actuated by an extension 39 (Figs. 1 and 3) carried by an operating handle structure shown most clearly in Fig. 1.

Thus, the handle structure includes a sleeve 40 having an enlarged skirt at its upper edge. The operating arm 39 extends through a slot in this skirt portion. It is formed integrally with an outer race 41. This outer race is joined to the inside of the sleeve 40 as by welding, so that rotation of the sleeve 40 causes corresponding movement of operating arm 39. Ball bearings 42 are confined by race 41 against the shoulder formed by the hollow extension 43 of the sleeve 13. A confining ring 44 is disposed around the ball bearings 42 and rests against the lower surface of the body 1. The outer race 41 is held in place by a split ring 45 that engages the washer 46.

The lower end of the sleeve 40 accommodates the transverse arms 47 of an actuator member 48. This actuating member 48 serves to rotate plug 6. For this purpose, it has a projection 49 (Figs. 1 and 4) which engages loosely in the slot 50 formed in the bottom of the plug 6. The arms 47 are urged tightly against the lower edge of the transverse openings 51 in sleeve 40 by the aid of a screw 52. This screw 52 passes through a manual operating handle 53, and is threaded into the member 48. A cover member 54 extends over the arm 47, and is provided with diametrically opposed recesses 55 within which the arms 47 engage.

Movement of the handle 53 thus causes a corresponding rotary movement of the sleeve 40. Upon a sufficient movement of the handle 53, the arm 39 engages the crank 37 (Fig. 3) and causes the safety valve structure to open. Upon release of the handle 53, the compression spring 32 (Fig. 3) urges the push rod 30 downwardly.

Unless the safety valve closure structure is held in the open position, either manually or otherwise, this safety valve closure structure reassumes the closed position of Fig. 1, under the influence of spring 26.

Figure 5:
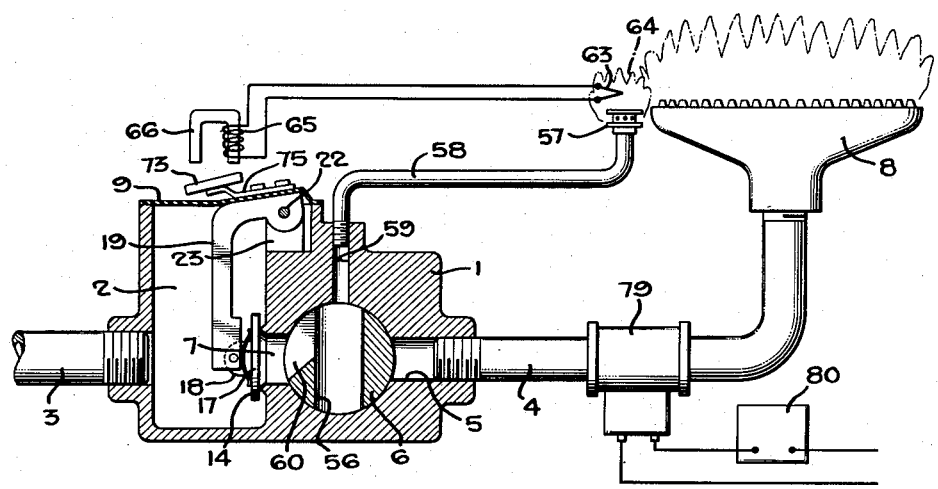
Fig. 5 is a diagrammatic sectional view, taken along plane 5—5 of Fig. 1, and illustrating the pilot and main burners.
Figure 4:
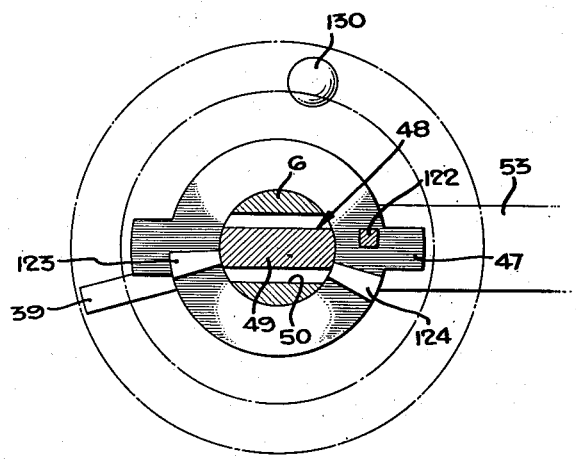
Fig. 4 is a sectional view, taken along plane 4—4 of Fig. 1.

As explained in the prior application hereinabove referred to, this safety valve opening movement can occur only while the plug 6 is in the closed position. This is also indicated in Fig. 4. Thus, as seen in Fig. 5, the plug 6 has a transverse port 56 which, in the position shown, interrupts the flow of fuel between the inlet and the outlet openings. However, in this position, fuel may pass to the pilot burner 57 through conduit 58 when the safety valve structure is open. For this purpose a port 59 (Fig. 5) is used which communicates with the port 56 and thence with the slot 60 formed in the plug 6.

There is considerable lost motion between the projection 49 and the slot 50 (Fig. 4). Due to the lost motion, the force of spring 32 (Fig. 3) when handle 53 is released, urges the actuator to the central or inactive position without the necessity of rotating plug 6. Since the plug 6 is left stationary during this return movement, the friction between the plug and its seat 29 is ineffective to restrain movement of the actuator 48.

The plug 6, once the safety valve is opened and held in open position, can be turned in a clockwise direction, as viewed in Fig. 5, to align port 56 with the ports 5 and 7. In that position the passage of fuel to the pilot burner is maintained through the slot 60. A ball detent 130 (Figs. 3 and 4) located in body 1 cooperates with arm 39 to provide a yielding resistance to clockwise movement of the plug 6 beyond fully open position. However, since the detent 130 may be depressed, the plug 6 may be turned to a fully inactive position by moving it a half revolution from the position of Fig. 5.

As shown most clearly in Fig. 4, the actuator 48 is provided with stop abutments 123 and 124 that limit the angular movement of the actuator with respect to stop 122 formed on the projection 41 of sleeve 13. In this way, the valve plug 6 can be moved only through the desired controlling angles.

In order to hold the safety valve closure mechanism in the open position of Fig. 2 while the pilot burner 57 is ignited, use is made of an electromagnetic structure energized by the aid of a thermocouple 63 (Fig. 5). This thermocouple 63 has a hot junction adapted to be inserted in the pilot flame 64. The thermocouple is connected to an electromagnet coil 65. This electromagnet coil is disposed over one leg of a magnetic core 66. The connection to the coil 65 may be effected by the aid of a pair of binding posts 67 supported on a wall of the supplemental casing 61. The electromagnet structure, including the coil 65 and the core 66, are held in place with respect to the top wall of the casing 61 by the aid of a non-magnetic cover member 68. This cover member 68 has a flange 69 contacting the lower side of the upper casing wall. A plate 70, disposed on top of the casing 61, serves as a base for the accommodation of the fastening screws 71 passing through the flange 69. The plate 70 can, if desired, be utilized as a name plate for the device. A cover 72 of non-magnetic material may be disposed over the coil 65.

The legs of the core 66 project through appropriate apertures in the bottom of cover 68 so as to be disposed within the casing 61.

Cooperating with the core 66 is a disc armature 73. This armature 73, when the safety valve closure is opened, is urged into contact with the polar areas of core 66. For this purpose the armature is mounted on a headed stud 74 which, in turn, is fastened as by riveting to an arm 75. This arm 75 is channel-shaped in section, and is attached, as by the aid of the screws 76 to the lever 19. The screws 76 pass through the diaphragm 9, as well as through an interposed fabric member 77. In this way the armature and its supporting elements are mounted on the lever 19 and diaphragm 9.

A light compression spring 78 is interposed between the end of the arm 75 and the lower surface of the armature 73. In this way, there is enough freedom of movement of armature 73 so that it may accurately align itself with the lower polar areas of the core 66.

Since the lever 19 is pivotally mounted on pin 22, movement of this lever about the pin 22, when the handle 53 is moved to safety valve opening position, lifts the armature 73 into contact with core 66. If the pilot flame 64 is not in existence, the armature 73 will drop away to the position of Fig. 1 upon release of the handle 53. Furthermore, lifting movement of the armature 73 to cooperative position with the core 66 in the manner described is essential, since the power generated by aid of the thermocouple 63 is not sufficient to attract the armature 73 from the position of Fig. 1 to the position of Fig. 2.

The casing 61, with the core 66 and coil 65, may be removed and replaced as a unit. This facilitates repair or replacement when required. The armature 73 and its cooperating supports do not interfere with the removal of the casing and the parts that it carries.

Operation of the system may be best explained in connection with Figs. 1, 2 and 5.

When the system is inactive, the plug 6 is in the position of Fig. 5. In this position, the passage of fuel to the pilot burner 57 and to the main burner 8 is prevented by the safety valve closure structure. When it is desired to initiate the operation of the system, the handle 53 is turned, as permitted by the lost motion between the projection 49 and the slot 50 formed in the bottom of the plug 6. This movement causes the arm 39 to rock the crank 37 (Fig. 3). Rod 30 is moved upwardly and moves the arm 36 attached to the lever 19, so as to rock the lever 19 to the open position of Fig. 2. In this position fuel to the pilot burner only is supplied by aid of the port 59, port 56, and slot 60. Now the pilot burner may be ignited. As soon as the flame 64 is in existence, while holding handle 53 in safety valve opening position, the electromagnet coil 65 is energized and holds the armature 73 in the open position of Fig. 2. The handle 53 may now be released. The safety valve being open, the plug 6 may be manipulated to supply fuel to the burner 8 through outlet conduit 4.

In order that the system may respond to a condition of operation such as temperature, use may be made of an electromagnetically operated valve 79 (Fig. 5) interposed in the conduit 4. This electromagnetically operated valve is energized and de-energized in accordance with a temperature responsive switch 80, such as a thermostatic switch. Accordingly, no fuel can pass to burner 8 unless both the plug 6 is in open position and the valve 79 is opened in response to temperature conditions.

The inventor claims:

1. In a safety valve structure: a valve body providing a plug valve seat; a plug in said seat; said body having inlet and outlet ports opening in said seat; a flexible diaphragm forming a chamber in the body in connection with the inlet portion; said body providing a safety valve seat in the chamber; a pivoted safety closure in the chamber and attached to the diaphragm, said diaphragm being movable upon movement of the closure; an electromagnet supported exterior of the diaphragm; an armature cooperating with the electromagnet; said electromagnet being normally incapable of attracting and holding the armature until the armature is moved from its unattracted position into a juxtaposition with the electromagnet and to an attracted position; an arm for supporting the armature and attached to the diaphragm and the safety valve closure; said arm when the safety valve closure is opened, serving to move the armature to said attracted position; and means biasing the safety valve closure to closed position; to return the safety valve closure to closed position independently of the position of the main plug valve.

2. In a valve structure: a valve body providing a plug valve seat and having inlet and outlet ports opening in said seat, as well as a chamber communicating with one of said ports; a rotary plug in said seat; an operator for the plug; means forming a lost motion connection between the plug and the operator; a safety valve closure structure in the chamber for controlling the said one of the ports, and including a pivotally mounted member and a closure carried by the member; a flexible wall defining said chamber and attached to the member; means urging said safety valve closure to closed position; means responsive to a rotary movement of the operator within an angle during which the plug valve is closed, for opening the safety valve closure; an electromagnet supported exterior of the wall; an armature cooperating with the electromagnet; said electromagnet being normally incapable of attracting and holding the armature until the armature is moved from its unattracted position into juxtaposition with the electromagnet and to an attracted position; and an arm for supporting the armature and attached to the wall and to the safety valve closure; said arm when the safety valve closure is opened, serving to move the armature to said attracted position; said urging means serving to move the closure to closed position when the electromagnet is deenergized, irrespective of the position of the plug.

3. In a valve structure: a valve body providing a plug valve seat and having inlet and outlet ports opening in said seat, as well as a chamber communicating with one of said ports; a rotary plug in said seat; an operator for the plug; means forming a lost motion connection between the plug and the operator; a safety valve closure structure in the chamber for controlling the said one of the ports, and including a pivotally mounted member and a closure carried by the member; a flexible wall defining said chamber and attached to the member; means urging said safety valve closure to closed position; means responsive to a rotary movement of the operator within an angle during which the plug valve is closed, for opening the safety valve closure; a detachable casing disposed over the wall and forming a space bounded by the wall and the casing; an electro-magnet supported exterior of the wall; terminal means for the electromagnet supported by the casing; an armature cooperating with the electromagnet; said electromagnet being normally incapable of attracting and holding the armature until the armature is moved from its unattracted position into juxtaposition with the electromagnet and to an attracted position; and an arm in the casing and attached to the movable wall and the safety valve closure, for supporting the armature; said arm when the safety valve closure is opened, serving to move the armature to said attracted position; said urging means serving to move the closure to closed position when the electromagnet is deenergized, irrespective of the position of the plug.

WILLIAM A. RAY.

REFERENCES CITED

The following references are of record in the file of this patent:

UNITED STATES PATENTS

| Number | Name | Date |
|---|---|---|
| 2,354,704 | Ray | Aug. 1, 1944 |
| 2,472,384 | Ray | June 7, 1949 |